(12) United States Patent
Bomer et al.

(10) Patent No.: US 8,814,038 B1
(45) Date of Patent: Aug. 26, 2014

(54) IDENTIFICATION CODE BASED INFORMATION SYSTEM

(71) Applicant: Caterpillar Inc., Peoria, IL (US)

(72) Inventors: Bradley K. Bomer, Pekin, IL (US);
Drew A. Fehr, Washington, IL (US);
Zhijun Cai, Springfield, IL (US);
Vardhaman M. Lakhani, Peoria, IL (US); Kevin R. Dluzen, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/763,884

(22) Filed: Feb. 11, 2013

(51) Int. Cl.
*G06F 17/00* (2006.01)
(52) U.S. Cl.
USPC .......................................................... 235/375
(58) Field of Classification Search
USPC .......................................................... 235/375
See application file for complete search history.

(56) References Cited

U.S. PATENT DOCUMENTS

| | | | |
|---|---|---|---|
| 8,567,681 B2 * | 10/2013 | Borges et al. | 235/462.13 |
| 2009/0108057 A1 | 4/2009 | Mu et al. | |
| 2010/0241857 A1 | 9/2010 | Okude et al. | |
| 2012/0059875 A1 | 3/2012 | Clark | |
| 2012/0239224 A1 * | 9/2012 | McCabe et al. | 701/2 |
| 2012/0303323 A1 * | 11/2012 | Ha et al. | 702/183 |

FOREIGN PATENT DOCUMENTS

| | | |
|---|---|---|
| JP | 2007008336 | 1/2007 |
| JP | 2007163233 | 6/2007 |

* cited by examiner

*Primary Examiner* — Christle I Marshall
(74) *Attorney, Agent, or Firm* — Miller, Matthias & Hull

(57) ABSTRACT

A system for providing information associated with an identification code to an operator of a machine is provided. The system includes a plurality of sensors configured to generate signals indicative of a parameter associated with an operation of the machine. The system also includes a display unit. The system further includes a controller communicably coupled to the plurality of sensors and the display unit. The controller is configured to receive the signals indicative of the parameter associated with the operation of the machine. The controller then determines an operation mode of the machine based on the received signals and identifies the identification code based on the determined operation mode. The controller further displays the identification code based on the determined operation mode on the display unit.

20 Claims, 6 Drawing Sheets

Set tires during dig

Issue sufficient lift command to set tires and transfer weight to the front of the machine. This leads to even weight distribution on all four tires thus reducing tire slip. Proper tire setting may lead to increased tire life and increased productivity.

See section 8.3.1 of the Operation and Maintenance Manual for more information

*FIG. 4*

IDENTIFICATION CODE BASED INFORMATION SYSTEM

TECHNICAL FIELD

The present disclosure relates to an identification code based information system, and more particularly the identification code based information system employed within machines on a worksite for instructing or training an operator regarding operational techniques related to the machine.

BACKGROUND

Machines, such as excavators, bulldozers, compactors, haul trucks, graders, scrapers, tractors, backhoe loaders, skid steers and other types of machines found in various industries such as mining, construction, waste management, energy production, forestry, transportation, and others are designed to perform a variety of tasks. Each machine may be designed for optimal performance and efficiency of such tasks when operated in a particular manner. However, operators may tend to deviate from the ideal operating methods while using the machine. This can be due to a variety of reasons such as, for example, limited operational skills, dynamic and challenging working environments, fatigue, etc. Failure to follow the expected operating methods may lower the machine performance, affect fuel efficiency, and the like; amongst other undesirable effects.

Traditional tools on-board the machine may provide text feedback to the operator relating to information that may serve as a guide to the operator. This information is typically corrective in nature. These tools may provide limited coaching information without informing the operator of the expected operating method. Generally, the information provided by these tools is based on a sequence of manual selections made by the operator. Hence, the operator may sometimes have to peruse through many unrelated topics to arrive at the specific information required by him/her.

A JP Published Application Number 2007/008336 discloses a system and method for recognizing information on a vehicle. A diagnostic system creates a multidimensional barcode which indicates the details of a failure, when a failure is detected, and an address of a repair instruction database server. The barcode is displayed on a display device with a failure part code indicating a failure part. When a driver reads the barcode, displayed on the display device, by using a cellular phone, the cellular phone extracts the details of the failure and the address of the server from the barcode, and displays them on the screen of the cellular phone. The driver can browse and download a repair guide for the failure by getting access to the server via the cellular phone through the use of the address displayed on the screen of the cellular phone.

However, the information displayed to the operator is based on the detection of failure of the part and does not instruct or provide training to the operator based on a current activity being performed on or by the machine. Hence, there is a need of an improved system to provide training specific information to the operator.

SUMMARY OF THE DISCLOSURE

In one aspect of the present disclosure, a system for providing information associated with an identification code to an operator of a machine is provided. The system includes a plurality of sensors configured to generate signals indicative of a parameter associated with an operation of the machine. The system also includes a display unit. The system further includes a controller communicably coupled to the plurality of sensors and the display unit. The controller is configured to receive the signals indicative of the parameter associated with the operation of the machine. The controller then determines an operation mode of the machine based on the received signals and identifies the identification code based on the determined operation mode. The controller further displays the identification code based on the determined operation mode on the display unit.

In another aspect of the present disclosure, a method for providing information associated with an identification code to an operator of a machine is provided. The method receives a signal indicative of the parameter associated with an operation of the machine. The method determines an operation mode of the machine based on the received signals. The method then identifies the identification code based on the determined operation mode. The method further displays the identification code based on the determined operation mode on a display unit.

Other features and aspects of this disclosure will be apparent from the following description and the accompanying drawings.

BRIEF DESCRIPTION OF THE DRAWINGS

FIG. 4 is another exemplary display of the identification code based information system;

DETAILED DESCRIPTION

Figure 1:
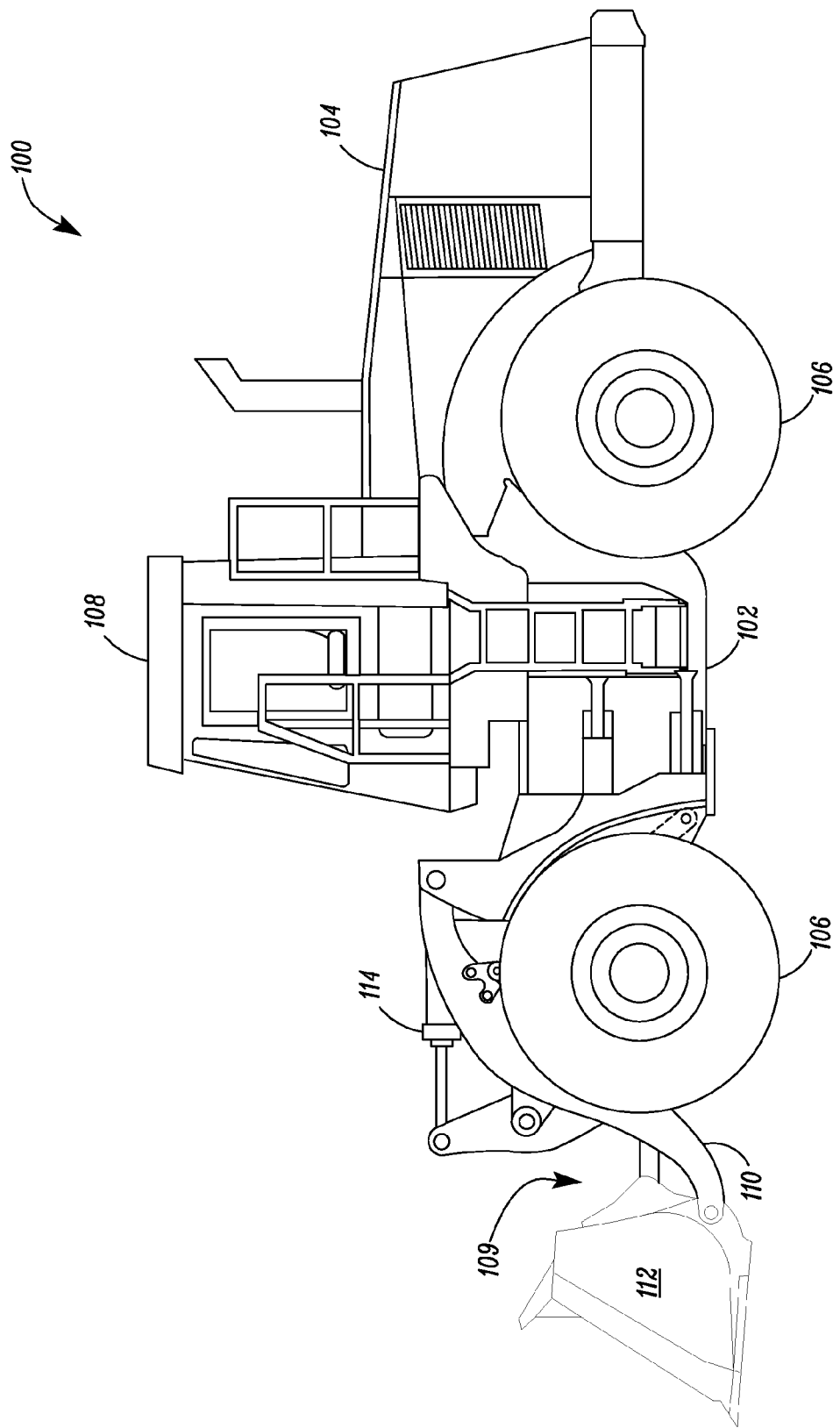
FIG. 1 is an exemplary machine, according to one embodiment of the present disclosure.

Wherever possible, the same reference numbers will be used throughout the drawings to refer to the same or the like parts. FIG. 1 represents an exemplary machine 100, according to one embodiment of the present disclosure. More specifically, the machine 100 may embody a wheel loader as shown in the illustrated embodiment. It should be understood that the machine 100 may alternatively include other mining, transportation, forestry or any other industrial, agricultural or construction machinery.

Referring to FIG. 1, the machine 100 may include a chassis and/or a frame 102. A powertrain or a drivetrain (not shown) may be provided on the machine 100 for the production and transmission of motive power. The powertrain may include power source and may be located within an enclosure 104 of the machine 100. The power source may include one or more engines, power plants or other power delivery systems like batteries, hybrid engines, and the like. It should be noted that the power source could also be external to the machine 100. A set of ground engaging members 106, such as wheels, may also be provided on the machine 100 for the purpose of mobility. The powertrain may further include a torque converter, transmission inclusive of gearing, drive shaft and other known drive links provided between the power source and the set of ground engaging members 106 for the transmission of motive power. Further, the machine 100 may include an operator cabin 108 which houses controls for operating the machine 100.

As shown in FIG. 1, the machine 100 may have a linkage assembly 109 attached to the frame 102. The linkage assembly 109 may include a lift arm 110. An implement, such as a bucket 112, may be pivotally coupled to the lift arm 110. It may be noted that the linkage assembly 109 and the implement of the machine 100 may vary based on the type of machine 100 or the type of operation or task required to be carried out by the machine 100. During operation of the machine 100, the lift arm 110 and the bucket 112 may be moved to different positions in order to perform excavation and dumping tasks. The movement of the lift arm 110 and/or the bucket 112 may be controlled by hydraulic and/or pneumatic cylinders 114 which are coupled to these parts. Accordingly, based on the movement of the lift arm 110 and the bucket 112, the machine 100 may perform different operations such as loading, dumping, excavating, and the like.

The present disclosure relates to an identification code based information system 200 (see FIG. 2) including a controller 202 which is configured to identify and display an identification code based on a current operation mode of the machine 100. Based on the identification code, the identification code based information system 200 may retrieve information associated with corresponding operational mode of the machine 100. In one embodiment, this information may be used to guide or tutor the operator based on an expected or ideal technique related to the current operation mode of the machine 100.

Figure 2:
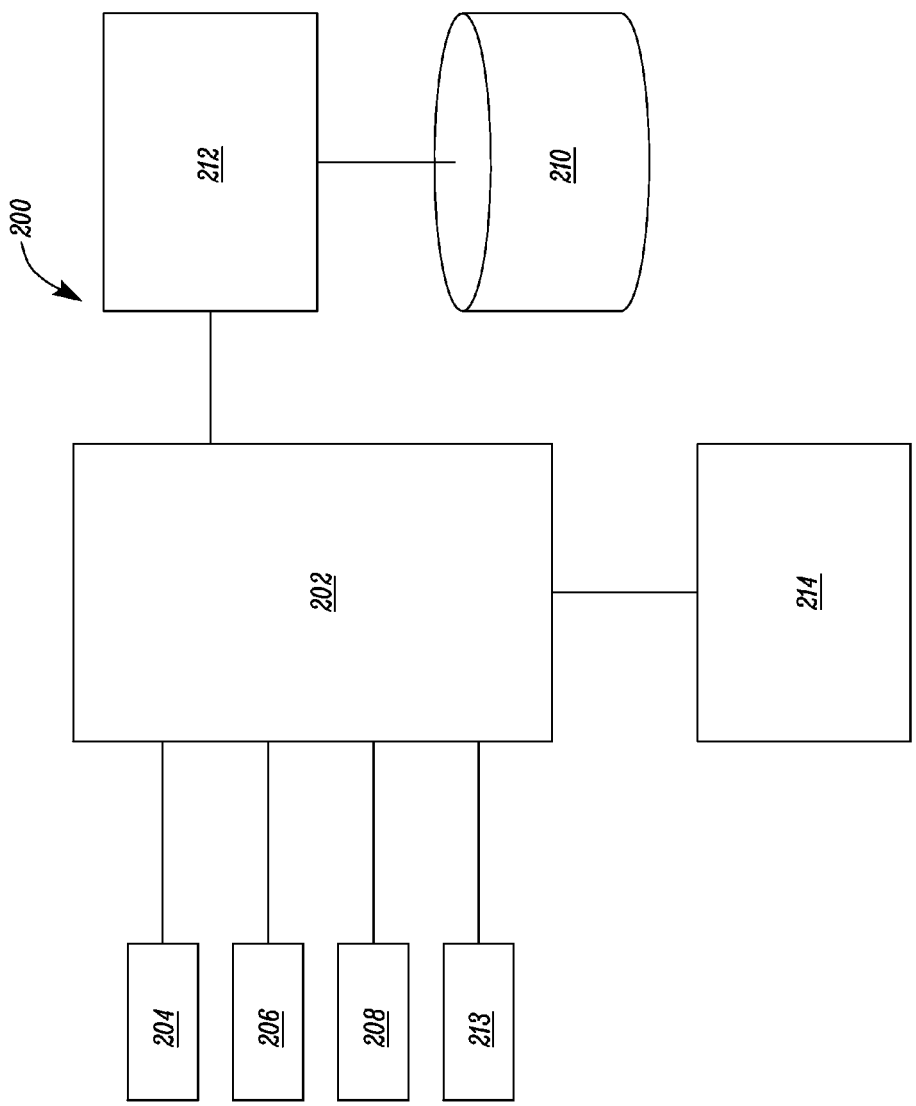
FIG. 2 is a block diagram of an identification code based information system.

Referring to FIG. 2, a plurality of sensors 204, 206, 208 may be installed on the frame 102 of the machine 100, the lift arm 110, the bucket 112, the hydraulic cylinders 114, and the like for monitoring an operation of the machine 100. These sensors 204, 206, 208 may also be installed on other parts of the machine 100 like the power source, the transmission unit, the ground engaging members 106, etc. Moreover, these sensors 204, 206, 208 may be any one or a combination of sensors like inclinometer, magnetometer, accelerometer, displacement sensor, pressure sensor, temperature sensor, speed sensor, rotational speed sensor and the like. The sensors 204, 206, 208 may be configured to provide signals indicative of the various parameters associated with the operation of the machine 100. The parameters may include operation speed, operation pressure, temperature, and the like.

For example, in the given embodiment, the plurality of sensors may include an accelerometer 204, a displacement sensor 206 and a pressure sensor 208. The accelerometer 204 and the displacement sensor 206 may be installed on the bucket 112 and the lift arm 110 respectively. The accelerometer 204 and the displacement sensor 206 may provide signals indicative of the movement of the lift arm 110 and the bucket 112 relative to the frame 102 of the machine 100. Further, a pressure sensor 208 may be installed on the hydraulic cylinders 114 of the lift arm 110 to generate signals indicative of the power generated and/or transmitted by the hydraulic cylinders 114 to the lift arm 110 and the bucket 112 for performing the different tasks by the machine 100. In one embodiment, these signals may be indicative of the type of task being performed by the machine 100. Additionally, sensors associated with various operator input devices provided in the operator cabin 108 such as joysticks, steering wheel, foot pedals, or other operator controls that could provide feedback to the system to assist in determining mode of operation. Further, position sensors or pin angle sensors that determine relative position of linkage members and/or hydraulic actuators may also be used to provide signals indicative of the type of task being performed by the machine 100.

It should be understood that the plurality of sensors 204, 206, 208 described herein are exemplary and do not limit the scope of the disclosure. Other sensors known in the art may be installed on the power source, transmission unit and the ground engaging members 106 which may provide numerous signals indicative of various parameters related to the power generation and mobility of the machine 100. These signals, for example, may be indicative of the parameters like instantaneous power production, fuel consumption, crankshaft rotational speed, engine temperature, wheel slip, machine acceleration/deceleration, machine inclination, and the like which may be required for machine diagnostics.

As shown, the controller 202 may be communicably coupled to the plurality of sensors 204, 206, 208. The controller 202 may be capable of receiving the signals from the plurality of sensors 204, 206, 208. Further, based on the received signals, the controller 202 may be configured to determine the mode of operation of the machine 100 or the specific task being performed by the machine 100.

For example, neutral signals from the implement sensors and the ground engaging member 106 sensors and dynamic signals from the power source parameter sensors may be indicative of the machine 100 being in a non-operational mode with the power source in idling mode. For example, for a wheel loader during a load-haul-dump cycle, the controller 202 may receive signals from the accelerometer 204, displacement sensor 206 and the pressure sensor 208 installed on the linkage assembly 109 indicative of lowering, tilting and consecutive raising of the bucket 112 with material loaded on to the bucket 112. Additionally, the controller 202 may receive signals from the power source parameter sensors installed in the powertrain of the wheel loader indicative of the transmission gear being engaged in a lower forward gear and the wheel loader moving at a specific speed. Furthermore, the controller may receive signals from the power source parameter sensors of the wheel loader coming to a halt and tilting of the bucket in raised position from the accelerometer 204, displacement sensor 206 and the pressure sensor 208. Based on these signals, the controller 202 may determine that the wheel loader is loading a material, moving to another location on the worksite and dumping the material thereafter. Accordingly, the identification code based information system 200 may determine that the operator is performing a load-haul-dump cycle and may provide an appropriate identification code that may direct the operator to specific coaching/instructional material relative to the determined mode of operation.

In one embodiment, the controller 202 may be communicably coupled to a database 210 via a communication system 212. The communication system 212 may be, but not limited to, a wide area network (WAN), a local area network (LAN), an Ethernet, Internet, an Intranet, a cellular network, a satellite network, or any other suitable network for transmitting data to and from the second database 210. In various embodiments, communication system 212 may include a combination of two or more of the aforementioned networks and/or other types of networks known in the art. Communication system 212 may be implemented as a wired network, a wireless network or a combination thereof. Further, data transmission between the controller 202 and the database 210 may occur over the communication system 212, in an encrypted or otherwise secure format, in any of a wide variety of known manners.

The controller 202 may retrieve data relating to the mode of operation of the machine 100 from the database 210. It should be noted that the database 210 may be any conventional or non-conventional database known in the art. Moreover, the database 210 may be capable of storing and/or modifying pre-stored data as per operational and design needs. Typically, the database 210 may be present at a remote location or off-board the machine 100. In some situations, the database 210 may also be present on-board the machine 100. However, such an application may have limited memory capacity requiring periodic updates.

The database 210 may contain pre-defined datasets having one or more signal readings associated with different operation modes related to the specific machine type. The database 210 may also contain other information related to the different machines employed on the worksite and a site map associated with the worksite on which the machines are employed. In one embodiment, the database 210 may further include a dataset of an expected metric associated with the operation mode of the machine 100. It should be noted that the expected metric may include numerical values corresponding to various tasks associated with the operation mode of the machine 100. Machine metrics may include cycle times, productivity, efficiency, effective utilization of the machine 100, and the like. The performance of the machine 100 may be measured based on deviation from the expected metric.

Further, the database 210 may be configured to store a plurality of identification codes associated with the different operation modes of the machine 100. In one embodiment, the identification code may be a quick response code, a barcode, or a uniform resource locator link. The quick response code may be a type of a matrix or a two-dimensional barcode having square dots arranged in a pattern. The quick response code may store encoded information in the form of numerical data, alphanumerical data and/or graphical data. The quick response code may also be capable of storing encrypted data. Alternatively, the identification code may also be any one or a combination of a barcode, a numerical code, an alphanumerical code, a symbolic code, a graphical image or any other representation known in the art. Further, the database 210 is also configured to store the information related to the identification code. The information may include textual information, video and audio clips, a combination of text and image data, or any other suitable multimedia files related to training material for the operator of the machine 100.

Based on the mode of operation of the machine 100 determined by the controller 202, the controller 202 may be configured to identify one or more of the identification codes that may be relevant to the operation being performed by the machine 100. In one embodiment, the controller 202 may be configured to identify the relevant identification codes based on monitoring a deviation of the current operation of the machine 100 from the expected metric retrieved from the database 210.

Alternatively, in another embodiment, an optional position detection module 213 may be communicably coupled to the controller 202. The position detection module 213 may provide positional data of the machine 100 with respect to the worksite. The position detection module 213 may be any one or a combination of a Global Positioning System, a Global Navigation Satellite System, a Pseudolite/Pseudo-Satellite or any other known position detection module known in the art.

The position detection module 213 may generate signals indicative of the current position data associated with the machine 100. The controller 202 may receive these signals from the position detection module 213. Further, the controller 202 may retrieve the known map of the worksite from the database 210. It should be noted that an expected operation mode of the machine 100 may be associated with the specific areas of the known map of the worksite. Accordingly, the controller 202 may determine the expected operation mode of the machine 100 based on the current position of the machine 100 relative to the worksite. For example, the machine 100 may be expected to perform an excavation operation at a specific location on the worksite. The controller 202 may identify the identification codes based on the expected operation mode of the machine 100. The expected operation mode may be based, alone or in part, on the current position of the machine 100 relative to the worksite.

In yet another embodiment, the identification codes may be manually pushed onto the controller 202. For example, a supervisor may oversee or inspect an operator performance and operation of the machine 100 from a distant location away from the machine 100. In such a situation, the supervisor may determine or identify and manually send a signal indicative of the identification code associated with the observed operation of the machine 100 to the controller 202.

Also, the controller 202 may monitor or keep a record of the number of instances when certain identification codes are repeatedly identified for a pre-determined period of time. A counter may be employed to keep a count of the number of times a particular identification code is identified. This count may be recorded and stored in a log specific to the operator or the machine 100 for the defined period of time. For example, for a single work week, the controller 202 may monitor the number of times a given operator and/or machine 100 is issued the same training material associated with the identification code. This may be helpful to provide an advanced training to the operators that have a tendency to repeat the same error in the operation of the machine 100. Possible ways of monitoring the identification specific to the operator may be based on an RFID or an operator ID of the operator, while the given machine 100 may be identified based on a unique machine code recorded by the system.

Figure 3:
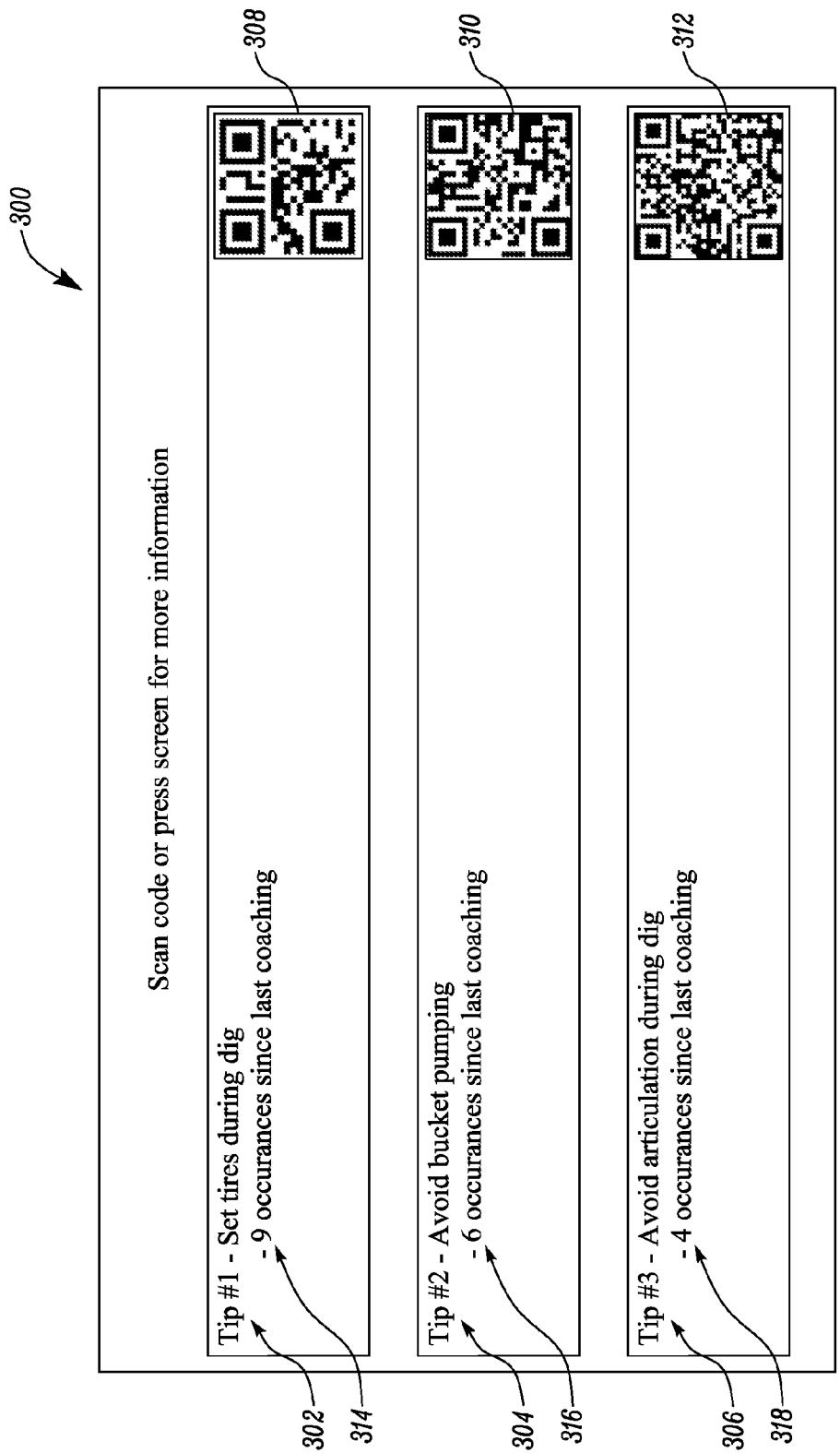
FIG. 3 is an exemplary display of the identification code based information system.
Figure 5:
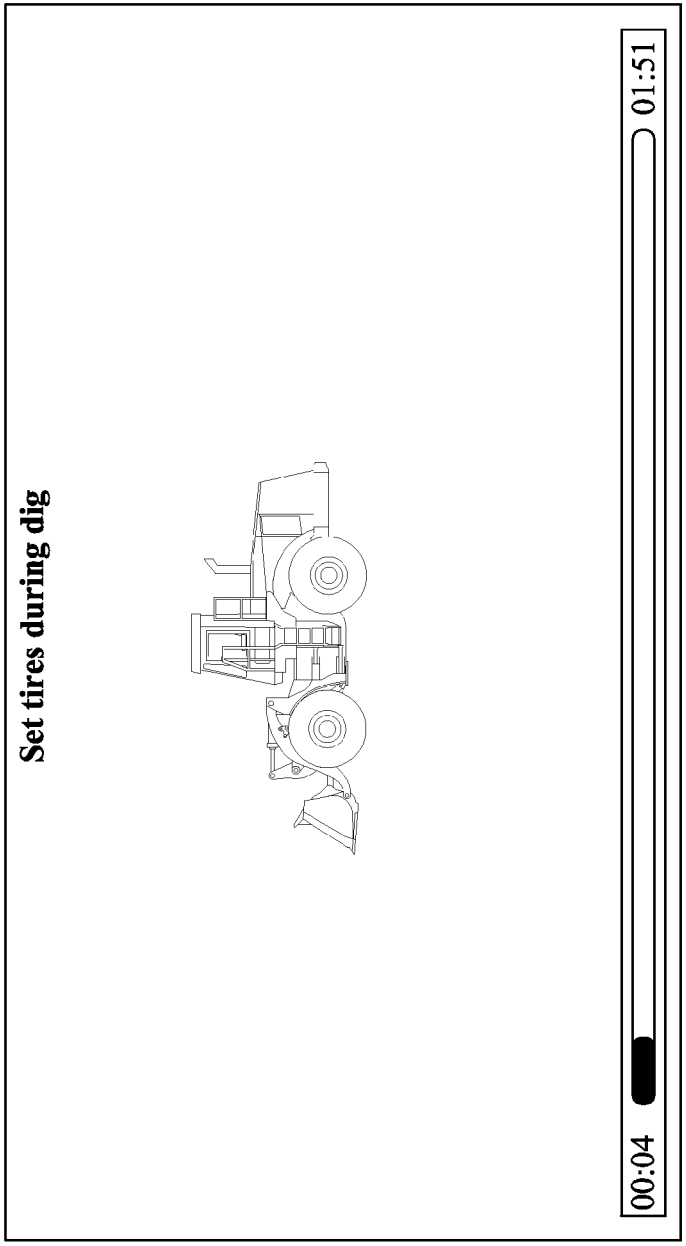
FIG. 5 is yet another exemplary display of the identification code based information system.

Referring to FIG. 2, the controller 202 may be communicably coupled to a display device 214. The display device 214 may be preferably located in the operator cabin 108 of the machine 100. The display device 214 may be a LCD device, a LED device, a CRT monitor, a touch screen device or any other known display device. The identification code determined by the controller 202 may be displayed on the display device 214. Further, in one embodiment, the information related to the identification code may be displayed on the display device 214. In yet another embodiment, the count of number of instances when the given identification code was identified by the controller 202 may also be displayed on the display device 214. FIGS. 3, 4 and 5 show exemplary displays 300, 400, 500 which may be displayed on the display device 214 located on the machine 100.

One of ordinary skill in the art will appreciate that alternatively, any portable device may be used to scan or read the identification code displayed on the display device 214. Based on the scanned identification code, the corresponding information related to the identification code may be retrieved from the database 210. The portable device may be any one, but not limited to, a smart phone, reader, tablet, or any other handheld device known in the art. It should be noted that the portable device may be capable of supporting applications required to allow the portable device to connect to the database 210 over a network. The connection between the display device 214 and the portable device may either be a wireless or a wired connection.

Referring to the exemplary display 300 shown in FIG. 3, a plurality of instructional tips 302, 304, 306 and corresponding identification codes 308, 310, 312 can be shown to the operator based on the operation mode determined by the controller 202. For example, in this case, based on the signals received from the plurality of sensors 204, 206, 208 the controller 202 may determine that the machine 100 is in an excavation operation mode.

Accordingly, the instructional tips 302, 304, 306 are related to setting of tires during dig, avoiding bucket pumping and avoiding articulation during dig, respectively. As shown, the identified identification codes 308, 310, 312 include quick response codes. Further, the display 300 also informs the operator that the identification code 308 is identified nine times (see section 314 of the display 300) since the prior coaching, whereas the identification codes 310 and 312 is identified six times and four times (see section 316, 318 of the display 300) respectively. It should be noted that the content of the information and the display format may be modified as per design requirements and does not limit the scope of the disclosure.

In this exemplary case, the display device 214 may be a touch screen. The operator may use touch gestures to access the informational content. For example, the operator may use touch gesture to access the instructional tip 302 displayed on the display device 214. Accordingly, another exemplary display 400 may be displayed on the display device 214. The display 400 informs the operator of the information associated with the identification code 302. As shown, related textual information may be provided to the operator to train the operator in setting the wheels of the machine 100 during training.

In another scenario, the controller 202 may retrieve suitable multimedia files from the database 210 related to the identified identification code 308. Accordingly, a relevant video file may be displayed on the display device 214, to the operator, as shown in the display 500.

The controller 202 may embody a single microprocessor or multiple microprocessors that includes a means for receiving signals from the plurality of sensors 204, 206, 208 in order to determine the mode of operation of the machine 100. Numerous commercially available microprocessors may be configured to perform the functions of the controller 202. It should be appreciated that the controller 202 may readily embody a general machine microprocessor capable of controlling numerous machine functions. A person of ordinary skill in the art will appreciate that the controller 202 may additionally include other components and may also perform other functionality not described herein. Further, the connections and sensors described herein are merely on an exemplary basis and do not limit the scope of the disclosure.

INDUSTRIAL APPLICABILITY

Guidelines to operate the machine are usually presented to the operator in the conventional form of manuals which are made available to the operator on-board of the machine. However, known tools for providing training and help topics to the operator typically require manual perusal of the user guide material. The present disclosure provides an identification code based information system 200 which may be used to automatically display related identification codes and information for tutoring the operator based on the current operation mode of the machine 100.

Figure 6:
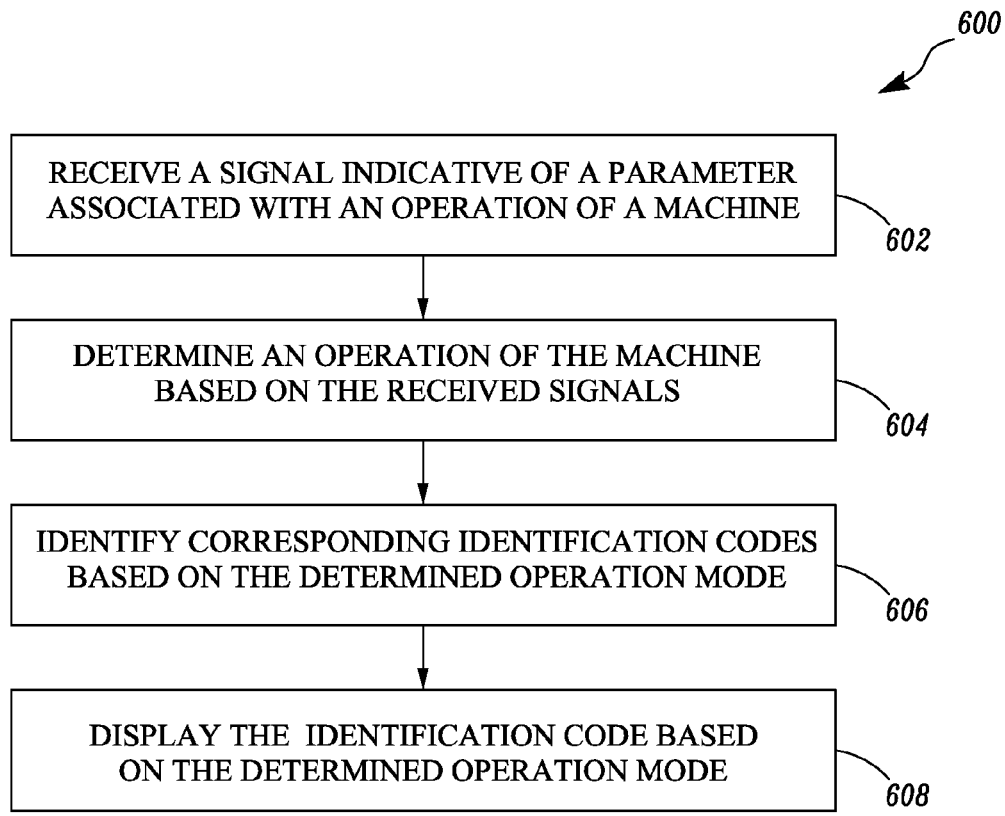
FIG. 6 is a flowchart of method for providing information associated with an identification code to an operator of the machine.

Referring to FIG. 6, at step 602, the controller 202 receives the signal indicative of the parameters associated with the operation of the machine 100 from the plurality of sensors 204, 206, 208. In one embodiment, the controller 202 may receive the signals indicative of the position of the machine 100 on the given worksite from the position detection module 213.

At step 604, based on the received signals, the controller 202 may be configured to determine the mode of operation of the machine 100. In another embodiment, the controller 202 may determine the operation mode of the machine 100 based on data retrieved from the database 210. For example, for a wheel loader during a load and dump cycle, the controller 202 may receive signals from the accelerometer 204, displacement sensor 206 and the pressure sensor 208 installed on the linkage assembly 109 indicative of lowering, tilting and consecutive raising of the bucket 112 with material loaded on to the bucket 112. Additionally, the controller 202 may receive signals from the power source parameter sensors installed in the powertrain of the wheel loader indicative of the transmission gear being engaged in a lower forward gear and the wheel loader moving at a specific speed. Furthermore, the controller may receive signals from the power source parameter sensors of the wheel loader coming to a halt and tilting of the bucket in raised position from the accelerometer 204, displacement sensor 206 and the pressure sensor 208. Based on these signals, the controller 202 may determine that the wheel loader is loading a material, moving to another location of the worksite and dumping the material thereafter.

At step 606, the controller 202 may identify the identification code based on the determined operation mode of the machine 100. In one embodiment, the controller 202 may be configured to monitor the operating metrics associated with the determined operation mode of the machine 100. Thereafter, the controller 202 may compare the operating metrics with the pre-stored expected metric dataset retrieved from the database 210. Accordingly, the controller 202 may identify the identification codes based on a deviation of the operating metrics from that of the expected metrics. In yet another embodiment, the controller 202 may identify the identification code based on the current position of the machine 100 on the worksite corresponding to the known worksite map. In other words, the controller 202 may determine the expected mode of operation of the machine 100 based on the position of the machine 100 on the given worksite.

At step 608, the identified identification code may be displayed on the display device 214. In addition to the identification code, the display device 214 may also display the information associated with the identification code.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for providing information associated with an identification code to an operator of a machine, wherein the machine supports multiple different but acceptable modes of operation, the system comprising:
 a plurality of sensors configured to generate signals indicative of a parameter associated with an operation of the machine;
 a display unit; and
 a controller communicably coupled to the plurality of sensors and the display unit, the controller configured to:
  receive the signals indicative of the parameter associated with the operation of the machine;

determine the operation mode of the machine based on the received signals;

identify the identification code based on the determined operation mode; and display the identification code based on the determined operation mode.

2. The system of claim 1 further comprising a position detection module communicably coupled to the controller, the position detection module configured to generate a signal indicative of a current position of the machine.

3. The system of claim 2, wherein the identification of the identification code is further based on the current position of the machine and a pre-defined dataset associated with a worksite of the machine.

4. The system of claim 1, wherein the controller is further configured to monitor operating metrics associated with the operation mode of the machine.

5. The system of claim 4, wherein the controller is further configured to compare the monitored operating metrics with a pre-defined expected metric dataset.

6. The system of claim 5, wherein the controller is configured to identify the identification code based on the comparison.

7. The system of claim 1, wherein the display unit is further configured to display the information associated with the identification code.

8. The system of claim 1, wherein the identification code includes at least one of a bar code, a quick response code and a uniform resource locator link.

9. A method for providing information associated with an identification code to an operator of a machine having multiple distinct but acceptable modes of operation, the method comprising:

receiving a signal indicative of a parameter associated with an operation of the machine;

determining an operation mode of the machine based on the received signals;

identifying the identification code based on the determined operation mode; and displaying the identification code based on the determined operation mode.

10. The method of claim 9 further comprising receiving a signal indicative of a current position of the machine.

11. The method of claim 10, wherein the identification of the identification code is further based on the current position of the machine and a pre-defined dataset of a worksite of the machine.

12. The method of claim 9 further comprising monitoring operating metrics associated with the operation mode of the machine.

13. The method of claim 12 further comprising comparing the monitored operating metrics with a pre-defined expected metric dataset.

14. A machine comprising:

a power source;

a plurality of sensors configured to generate signals indicative of a parameter associated with an operation of the machine;

a display unit; and a controller communicably coupled to the plurality of sensors and the display unit, the controller configured to:

receive the signals indicative of the parameter associated with the operation of the machine;

determine an operation mode of the machine based on the received signals, each operating mode representing a distinct but acceptable mode of operation of the machine;

identify an identification code based on the determined operation mode; and display the identification code based on the determined operation mode.

15. The machine of claim 14 further comprising a position detection module communicably coupled to the controller, the position detection module configured to generate a signal indicative of a current position of the machine.

16. The machine of claim 15, wherein the identification of the identification code is further based on the current position of the machine and a pre-defined dataset associated with a worksite of the machine.

17. The machine of claim 14, wherein the controller is further configured to monitor operating metrics associated with the operation mode of the machine.

18. The machine of claim 17, wherein the controller is further configured to compare the monitored operating metrics with a pre-defined expected metric dataset.

19. The machine of claim 18, wherein the controller is configured to identify the identification code based on the comparison.

20. The machine of claim 14, wherein the display unit is further configured to display the information associated with the identification code.

* * * * *